United States Patent [19]

Kempf

[11] 4,232,968

[45] Nov. 11, 1980

[54] OPTICAL COMPARATOR WITH 3-D IMAGE

[76] Inventor: Paul S. Kempf, 842 Juanita, Solana Beach, Calif. 92075

[21] Appl. No.: 972,655

[22] Filed: Dec. 26, 1978

Related U.S. Application Data

[63] Continuation-in-part of Ser. No. 895,245, Apr. 10, 1978, Pat. No. 4,168,912.

[51] Int. Cl.³ .............................................. G01B 9/08
[52] U.S. Cl. ..................................... 356/393; 350/144
[58] Field of Search ................. 356/394, 393, 392, 71; 350/144

[56] References Cited

U.S. PATENT DOCUMENTS

| | | | |
|---|---|---|---|
| 2,169,397 | 8/1939 | Stanley | 350/144 |
| 3,744,917 | 7/1973 | Craig | 356/394 |
| 4,017,147 | 4/1977 | Weber et al. | 356/394 |

Primary Examiner—John K. Corbin
Assistant Examiner—R. A. Rosenberger
Attorney, Agent, or Firm—Brown & Martin

[57] ABSTRACT

An optical comparator which provides confronting images of a pair of similar objects being compared, the images having a pronounced 3-D effect when viewed with a single eye. Images of the two objects are projected in separate optical paths and are greatly enlarged, the resultant composite image showing comparable portions of the two objects side-by-side with a sharp dividing line. The two objects are mounted in related alignment on a common holder and, when the holder is moved, the objects are scanned across their faces with the images converging toward or diverging from the dividing line, depending on the direction of motion of the holder.

11 Claims, 8 Drawing Figures

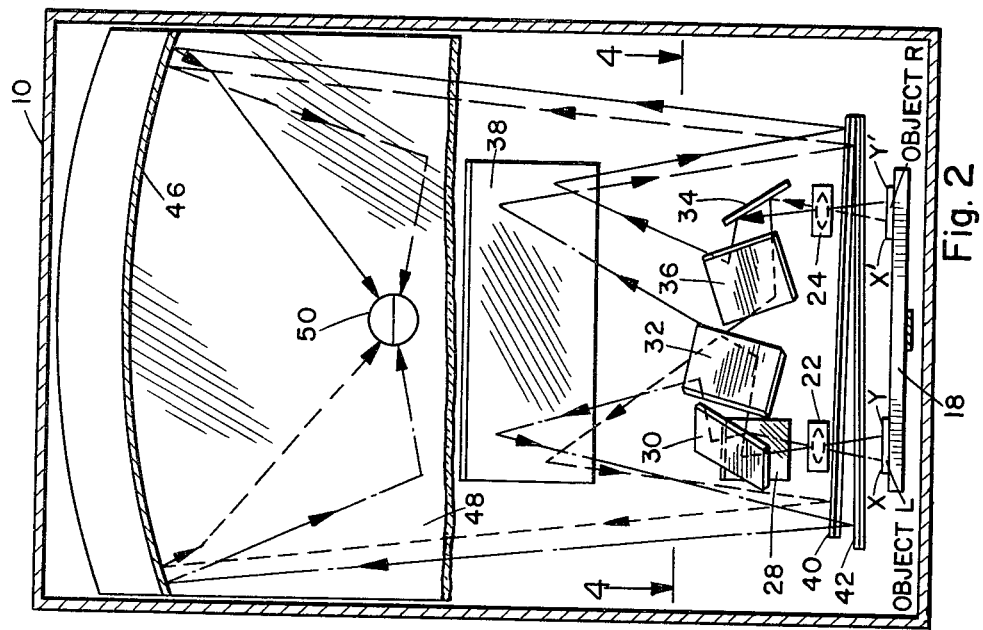
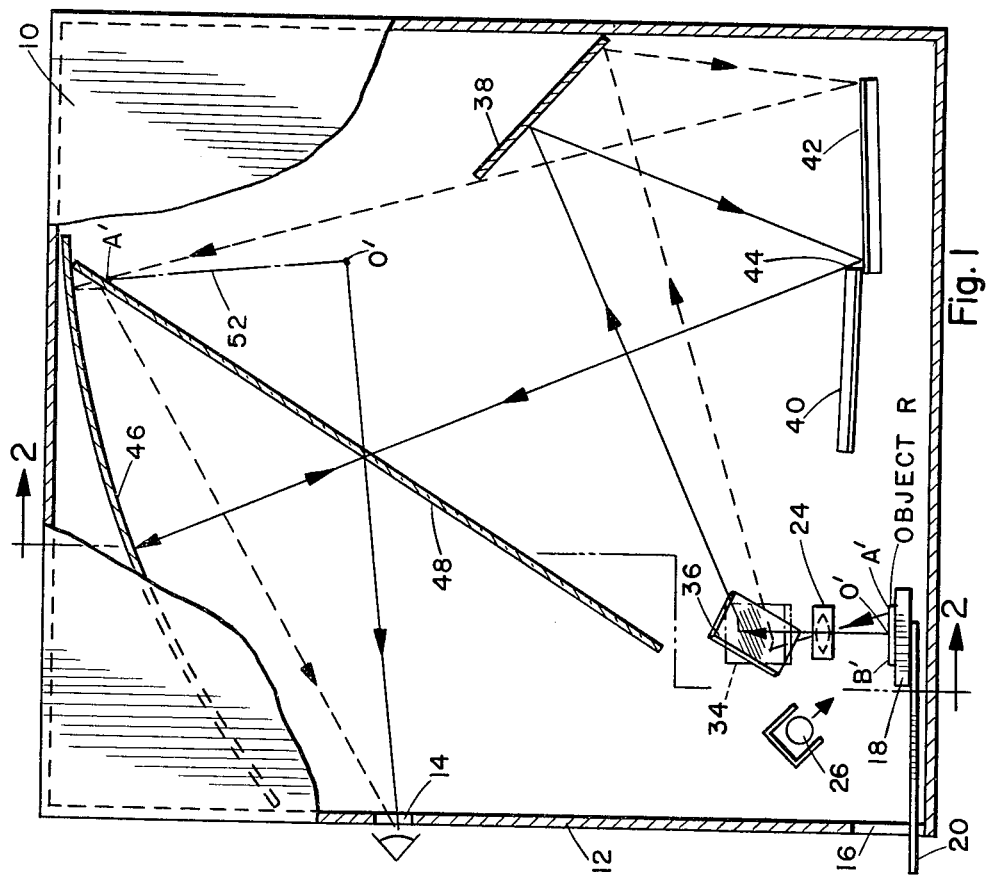

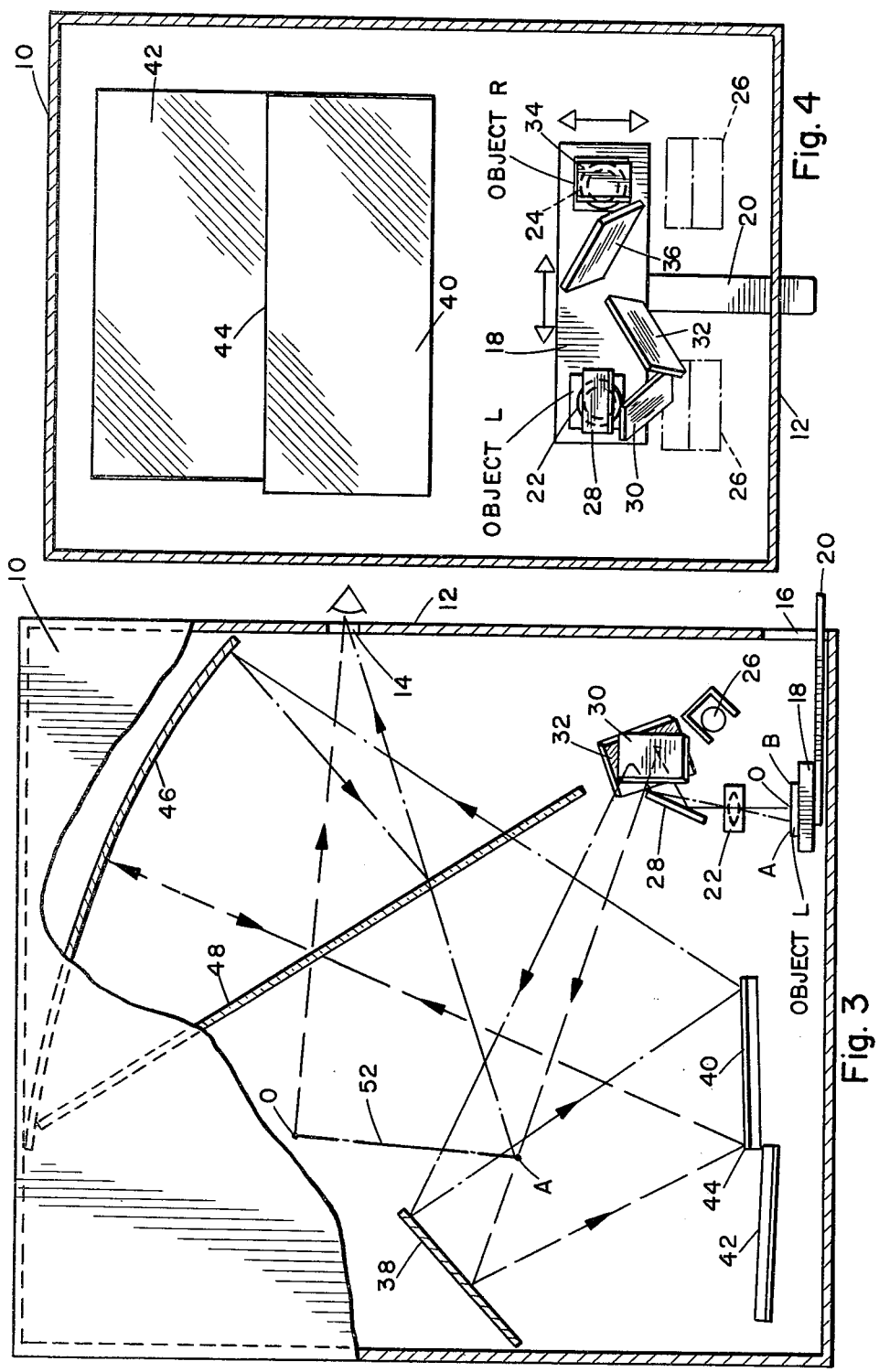

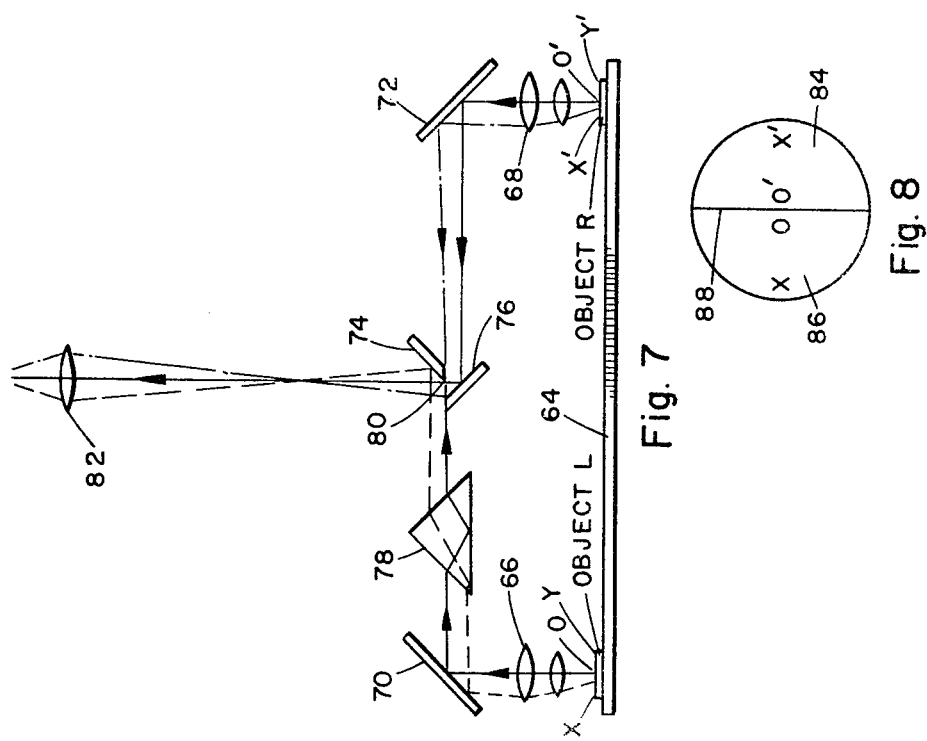
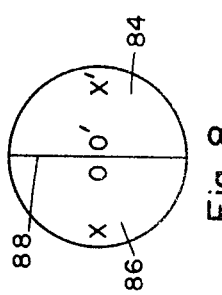
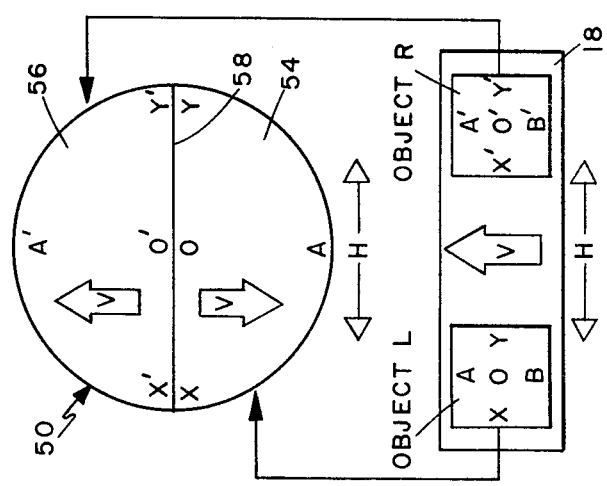
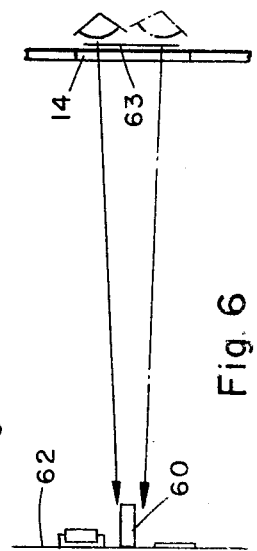

OPTICAL COMPARATOR WITH 3-D IMAGE

REFERENCE TO OTHER APPLICATION

This application is a continuation-in-part of my copending application Ser. No: 895,245, filed Apr. 10, 1978 and entitled "Optical Comparator", now U.S. Pat. No. 4,168,912.

BACKGROUND OF THE INVENTION

In the electronics industry, large numbers of components known as hybrids are used. The typical hybrid comprises a substrate on which a circuit is printed and various components such as microcircuit chips are connected to the printed circuit by very fine wires. Discrete components such as capacitors, resistors and the like may also be mounted on the substrate. The hybrid is very small and very careful inspection techniques are necessary to ensure consistent quality.

Conventional inspection techniques, such as viewing the hybrid through a magnifier and comparing it with a diagram or photograph, can be very time consuming and tiring to the eyes. Automatic circuit testing equipment can indicate faults, but visual inspection is still required to identify the fault and correct the component.

The optical comparator disclosed in the above mentioned copending application provides magnified mirror images of a master component and a production component in confronting relation, so that the comparable circuit elements can be directly compared. Access is provided to the production component while in the viewing position, so that a probe can be inserted to mark or correct inconsistencies and the work observed on the image. Each image is visible to one eye, the images being combined by the normal stereoscopic action of the eyes. If both eyes do not have equal vision, optical compensation can be provided, but must be adjusted for each individual.

SUMMARY OF THE INVENTION

The optical comparator described herein is basically similar to that disclosed in the above mentioned copending application, but has a modified optical system which produces an unusual and very useful result. Mirror images of a master component and a production component are projected in confronting relation with a sharp dividing line, so that comparable elements are easily compared in directly opposed alignment. In addition, the composite image has a pronounced three dimensional effect when viewed with one eye. While this is not theoretically possible and is not yet fully understood, the phenomenon does, in fact, occur and is quite startling at first sight. A number of persons using the comparator have confirmed the three dimentionsal image, viewed through a single eye opening with the other eye obstructed, without being told in advance of the effect.

The 3-D effect greatly enhances the quality of the image and enables the viewer to see the spacing or offset of components from the substrate where required. When spaced components are offset from the viewing axis, it is possible to see underneath their edges. This is particularly useful in detecting contamination of the very small electrical connections which might otherwise be hidden. The 3-D image also facilitates maneuvering of a probe between components for marking or correction of deficiencies.

In the comparator the master and product components are secured in spaced alignment on a holder, which is movable along two orthogonal axes for horizontal and vertical motion of the components in the focal plane of their respective projection lenses. The components are suitably illuminated and their images are projected in separate paths. Initially one image is inverted and reverted to provide the ultimate mirror images. The images are directed through multiple reflectors to a pair of separator mirrors, which overlap to provide a sharp line of separation between the images. The separate images are projected to a spherical mirror, which reflects the enlarged images to a beam splitter. From a single eye opening the viewer sees a real erect image of the product component, with the inverted and reverted image of the master component immediately below and joined along the line of separation. Comparable elements of the two components are thus vertically opposed in horizontal alignment, and appear to diverge from or converge into the line of separation as the holder is moved in the vertical scanning direction. When the holder is moved in the horizontal scanning direction, the components are scanned from left to right. With various combinations of movements of the holder, the entire components can be viewed in detail and held at any selected viewing position. By concentrating the vision near the separation line, discrepancies are easily detected and components can be inspected rapidly. For some uses it may be desirable to have both images erect, which can be accomplished by omitting the inverting and reverting stage in the one optical path. The technique is also adaptable to microscope type optics with a single eyepiece for viewing the composite 3-D images.

The primary object of this invention, therefore, is to provide a new and improved optical comparator with a 3-D image.

Another object of this invention is to provide an optical comparator in which the 3-D effect is visible to one eye.

Another object of this invention is to provide an optical comparator which provides confronting mirror images of two objects to be compared.

A further object of this invention is to provide an optical comparator in which the objects to be compared are scanned simultaneously in such a manner that discrepancies are immediately detectable.

Still another object of this invention is to provide an optical comparator in which the two images are both erect.

Other objects and advantages will be apparent in the following detailed description, taken in conjunction with the accompanying drawings, in which:

FIG. 1 is a right side elevation view of the comparator, with portions cut away to show the optical path of the product component image.

FIG. 2 is a sectional view taken on line 2—2 of FIG. 1.

FIG. 3 is a left side elevation view of the comparator, with portions cut away to show the optical path of the master component image.

FIG. 4 is a sectional view taken on line 4—4 of FIG. 2.

FIG. 5 illustrates the relationships of the components and their respective images.

FIG. 6 illustrates a viewing effect of the 3-D image.

FIG. 7 is a diagram of microscope optics incorporating the single eye viewing arrangement.

FIG. 8 shows the image orientation obtained with the optics of FIG. 7.

DESCRIPTION OF THE PREFERRED EMBODIMENT

The comparator is contained in a housing 10 of any suitable configuration to shield the optical system from stray light. The front panel 12 has a single eye opening 14 in the central portion and an access opening 16 in the lower portion.

Mounted in the lower portion of the housing is a holder 18 having a handle 20, which protrudes through the access opening 16 for moving the holder from left to right and in and out, relative to the viewer. On the left end of the holder 18 is a master component, which will be referred to as object L. On the right side of the holder is a product component, which will be referred to as object R. The two components are held by any suitable positioning means which will secure them in spaced alignment. Holder 18 is supported on any suitable mounting which will provide the necessary range of motion along two orthogonal axes. One example of a holder and adjustable mounting is a microscope stage, some types of which can be moved precisely to selected positions while holding a slide or other object in accurate alignment. Other such mechanisms are well known and the specific type is not critical.

To enable the optical paths to be shown clearly, brackets and supports for the various optical elements have been omitted. Any suitable structure may be used.

Mounted above the positions of the left and right objects are left and right projection lenses 22 and 24, respectively. The objects are illuminated by light sources 26 of any suitable type. The image of object L is projected through lens 22 to a first inverting mirror 28 and from there to a second mirror 30. From the second mirror 30 the light is reflected to a third mirror 32, which directs the light upwardly and to the rear of the housing. The image of object R is projected through lens 24 to a first mirror 34 and from there to a second mirror 36, which directs the light upwardly and to the rear of the housing. Certain of the mirrors could be replaced by prisms, but the mirrors are simpler to mount and align.

In the central rear portion of the housing is a large deflecting mirror 38, which deflects both images downwardly to a pair of separating mirrors 40 and 42 extending generally horizontally across the lower rear portion of the housing. The mirrors 40 and 42 have a slight overlap longitudinally, the overlapping edge 44 of mirror 40 providing the sharp dividing line between the images.

In the upper portion of the housing 10 is a concave, substantially spherical final mirror 46, below which is downwardly and forwardly inclined beam splitter 48. Separating mirror 40 reflects the image of object L up through the beam splitter 48 to the forward portion of concave mirror 46, which directs the image down to the lower portion of the beam splitter, as in FIG. 3. Separating mirror 42 reflects the image of object R up through the beam splitter 48 to the rear portion of concave mirror 46, which directs the image down to the upper portion of the beam splitter, as in FIG. 1. The separating mirrors are inclined slightly toward each other in the front to rear direction, so that portions of images extending beyond the dividing edge onto the other mirror are deflected clear of the concave mirror and do not appear in the viewed image.

The composite image 50 is indicated as a small circle in FIG. 2 and represents the exit pupil of the optical system. The actual image is greatly enlarged and appears to be behind the beam splitter at an image plane 52, indicated at FIGS. 1 and 3.

In FIG. 5 the orientation of the image 50 is illustrated in relation to the objects being viewed. The left and right sides of object L, the master component, are marked X and Y, the top A, the bottom B and the center O. The image of object L is inverted by the optical system and appears as the lower image 54 of composite image 50. Object R, the product component, is marked with similar letters with a prime added for identification. The image of object R is erect and forms the upper image 56 of composite 50.

When holder 18 is moved from side to side, or horizontally in the direction of arrows H, both images 54 and 56 will move together in registration. When holder 18 is moved from front to rear, or vertically in the direction of arrow V, the upper image 56 will move up and the lower image 54 will move down. The images thus appear to diverge from the dividing line 58. When the two objects are correctly aligned on the holder, comparable elements on the two objects will appear back to back in mirror images along the sharp dividing line. If holder 18 is moved in the direction opposite to arrow V, the images will converge into the dividing line 58. Thus by concentrating the gaze along the dividing line, the adjacent elements can be compared rapidly and discrepancies detected very easily. By appropriate motions of the holder the entire area of the objects can be scanned quickly. For some uses it may be desirable to have both images erect rather than having mirror images. This is easily accomplished by eliminating inverting mirror 28 and using the same initial mirror arrangement at both lenses.

The image is shown as being circular, but suitable masking could be inserted in the optical system to provide an image of rectangular or other shape. Light stops could also be used at any suitable location in the system to provide image separation.

A significant advantage in inspecting components in the comparator is the 3-D effect obtained in the image. It is not fully understood how this is produced but the effect is very pronounced when viewed with only one eye. The single eye viewing eliminates interocular competition and simplifies focusing for different users. Discrete elements on the surface of the substrate project clearly toward the viewer, and contamination or other undesirable matter on the surface stands out vividly.

An example of the effect is illustrated in FIG. 6. When the image of an element 60 projecting from the plane of the substrate 62 is centered on the viewing axis, it is possible to see both sides of the element. This is made possible by having lenses 22 and 24 which are as large as possible, compared to the area of the objects being viewed. The resultant exit pupil is substantially larger than the pupil of the viewer's eye and the effective viewing area is not particularly restricted. Thus by moving the eye to the limits of the exit pupil, indicated at 63, the line of sight can be directed over both sides of element 60. The range of eye movement as shown is exaggerated to clarify the action. It has also been observed that when an element spaced above the substrate is offset from the viewing axis, it is possible to see the area of substrate just under the edge of the element.

This is particularly useful in detecting contamination or damaged contacts which would be concealed in a flat image.

The hybrid components for which the comparator is particularly adapted are very small, on the order of one centimeter square or smaller, although larger components can also be handled. To mark or correct a discrepancy, a fine probe can be inserted through access opening 18 and will become visible in the image. The erect image of the product article facilitates natural motions of the probe, and the three dimensional image allows the probe to be maneuvered around the various elements. In the optical system tested, with a magnification of about 30X, there was ample depth of field to permit this operation.

The optical system is also adaptable, in simplified form, to a microscope, as in FIG. 7. Object L and object R are mounted on a holder or stage 64 and directly above the two objects are objective lenses 66 and 68. The lenses project images to first mirrors 70 and 72, which direct the images inwardly to separating mirrors 74 and 76, respectively. The image from mirror 70 is reverted from left to right by a reverting prism 78. Separating mirrors 74 and 76 overlap and the edge 80 of mirror 76 provides a sharp line of separation between the images.

The combined images are viewed through a single eyepiece 82 and appear as indicated in FIG. 8. Image 84 of object R is erect, while image 86 of object L is reverted, so that comparable elements are seen back to back on opposite sides of the line of separation 88.

Masking could be provided to shape the images as required and any suitable structure may be used to support the optical elements.

Having described my invention, I claim:

1. An optical comparator for providing a 3-D image to one eye, comprising:
    a housing;
    a holder movably mounted in said housing and having means for holding a pair of objects to be compared in spaced corresponding alignment;
    a pair of projection lenses spaced from said holder and positioned to project images of the objects in separate optical paths, one optical path including means for inverting and reverting the image;
    separating means positioned to receive the projected images and separate corresponding portions of the images along a common dividing line;
    image forming means for forming a composite of the projected images joined at the common dividing line;
    and said housing having an eye opening positioned for viewing said image forming means.

2. An optical comparator according to claim 1, wherein said separating means comprises a pair of separating mirrors, one mirror overlapping the other and having an overlapping edge defining the image dividing line.

3. An optical comparator according to claim 2, wherein said separating mirrors are inclined toward the overlapping edge.

4. An optical comparator according to claim 3, wherein said image forming means includes a beam splitter inclined across the optical paths and confronting said eye opening;
    and a final reflector for receiving images directed from said separating mirrors through said beam splitter and returning the images to the beam splitter for forming the final image thereon.

5. An optical comparator according to claim 4, wherein said final reflector is concave.

6. An optical comparator according to claim 4, wherein said housing has a front panel containing said eye opening, said front panel having a lower access opening, adjacent which said holder is mounted;
    said lenses being spaced above said holder;
    reflecting means mounted above said lenses to direct images substantially rearwardly in the housing;
    and a deflecting mirror in the rear portion of said housing to deflect the images to said separating mirrors.

7. An optical comparator according to claim 6, wherein said separating mirrors extend across the lower rear portion of the housing, said final reflector is in the upper portion of the housing, and said beam splitter is inclined forwardly and downwardly from the rear of the final reflector.

8. An optical comparator according to claim 7, wherein said final reflector is substantially spherical, with the concave face thereof confronting said separating mirrors.

9. An optical comparator according to claim 2, wherein said separating mirrors are mounted substantially between said lenses and are inclined to direct images to said eye opening.

10. An optical comparator according to claim 1, wherein the composite image formed by said image forming means has an effective exit pupil substantially larger than the eye pupil of a viewer.

11. An optical comparator according to claim 10, and including an eyepiece lens in said eye opening.

* * * * *